US008489352B2

(12) United States Patent
Higaki et al.

(10) Patent No.: US 8,489,352 B2
(45) Date of Patent: Jul. 16, 2013

(54) INFORMATION RECORDING MEDIUM, AND PROCESS MANAGEMENT APPARATUS AND PROCESS MANAGEMENT SYSTEM USING THE INFORMATION RECORDING MEDIUM

(75) Inventors: Hiroyuki Higaki, Yokohama (JP); Shinichirou Fukushima, Yokohama (JP); Makoto Aikawa, Sagamihara (JP); Atsushi Honzawa, Kawasaki (JP); Yuuichi Kobayashi, Yokohama (JP); Akira Kishida, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1122 days.

(21) Appl. No.: 12/059,093

(22) Filed: Mar. 31, 2008

(65) Prior Publication Data
US 2008/0262770 A1  Oct. 23, 2008

(30) Foreign Application Priority Data
Apr. 18, 2007  (JP) ................. 2007-108809

(51) Int. Cl.
*G01N 37/00*  (2006.01)
(52) U.S. Cl.
USPC ............ 702/82; 702/81; 702/83; 702/84
(58) Field of Classification Search
USPC ... 702/81–84; 709/203, 217, 223; 705/50–53, 705/55, 74–79, 14.1, 14.16, 14.26, 14.29, 14.35, 14.36, 26.41–26.44; 726/1–12, 16–21
See application file for complete search history.

(56) References Cited

U.S. PATENT DOCUMENTS
2010/0088401 A1* 4/2010 DeGraeve et al. ............ 709/223

FOREIGN PATENT DOCUMENTS
JP  2003-316861  11/2003
JP  2005-352600  * 12/2005

* cited by examiner

*Primary Examiner* — Sujoy Kundu
(74) *Attorney, Agent, or Firm* — Antonelli, Terry, Stout & Kraus, LLP.

(57) ABSTRACT

Apparatuses and method capable of reliably tracking processes through which products have passed without calling for expensive setup are necessary in production and distribution processes of the products. A process management apparatus including a data transmission/reception unit to and from an RFID tag of an information recording medium and a data generation unit comprises a process data generation unit for representing a process, a process pass certificate data generation unit for generating process data pass certificate data and a transmission/reception unit for the process data with the information recording medium and the process pass certificate data can track the processes through which the object products have passed.

16 Claims, 20 Drawing Sheets

FIG. 6

| | PROCESS CODE ~130 |
|---|---|
| 121 — PROCESS A | AAAA ~131 |
| 122 — PROCESS B | BBBB ~132 |
| 123 — PROCESS C | CCCC ~133 |

FIG. 7

| | MEMORY BANK | SIZE(bit) 330 | STORED DATA 340 |
|---|---|---|---|
| 320 | | | |
| 321 | RESERVED | 32 | PASSWORD |
| 322 | UII | 128 | ID |
| 323 | TID | 32 | ID UNIQUE TO TAG |
| 324 | USER1 | 256 | PROCESS CODE |
| 325 | USER2 | 256 | PROCESS CODE |
| 326 | USER3 | 256 | PROCESS CODE |
| 327 | USER4 | 256 | PROCESS PASS CERTIFICATE DATA |

USER 328

| MEMORY BANK | PROCESS DATA | |
|---|---|---|
| 324 — USER1 | AAAA | ~350 |
| 325 — USER2 | BBBB | ~352 |
| 326 — USER3 | CCCC | ~354 |
| 327 — USER4 | f( f(f(AAAA, KEY) EOR BBBB, KEY) EOR CCCC, KEY) | ~355 |

FIG. 12
PROCESS A
| PROCESS CODE | AAAA | ~700 |
| PROCESS PASS CERTIFICATE DATA | f(AAAA, KEY) | ~701 |
PROCESS B
| PROCESS CODE | BBBB | ~702 |
| PROCESS PASS CERTIFICATE DATA | f( f(AAAA, KEY) EOR BBBB, KEY) | ~703 |
PROCESS C
| PROCESS CODE | CCCC | ~704 |
| PROCESS PASS CERTIFICATE DATA | f( f( f(AAAA, KEY) EOR BBBB, KEY) EOR CCCC, KEY) | ~705 |

FIG. 15

|  | PROCESS CODE |
|---|---|
| PROCESS A | AAAA |
| PROCESS B | BBBB |
| PROCESS C | CCCC |
| PROCESS D | DDDD |
| PROCESS E | EEEE |

800 — PROCESS A, 801 — PROCESS B, 802 — PROCESS C, 803 — PROCESS D, 804 — PROCESS E

830 — AAAA, 831 — BBBB, 832 — CCCC, 833 — DDDD, 834 — EEEE

FIG. 18

| MEMORY BANK | PROCESS DATA |
|---|---|
| USER1 | DDDD |
| USER2 | EEEE |
| USER3 | 0000 |
| USER4 | f( f( f( f( f(AAAA,KEY)EOR BBBB,KEY)EOR CCCC,KEY)EOR DDDD,KEY)EOR EEEE,KEY) |

FIG. 22

|  | PROCESS 1 | PROCESS 2 | PROCESS 3 |
|---|---|---|---|
| A→B→C | f(AAAA,KEY) | f( f(AAAA,KEY) EOR BBBB,KEY) | f( f( f(AAAA,KEY) EOR BBBB,KEY) EOR CCCC,KEY) |
| A→C→B | f(AAAA,KEY) | f( f(AAAA,KEY) EOR CCCC,KEY) | f( f( f(AAAA,KEY) EOR CCCC,KEY) EOR BBBB,KEY) |
| B→A→C | f(BBBB,KEY) | f( f(BBBB,KEY) EOR AAAA,KEY) | f( f( f(BBBB,KEY) EOR AAAA,KEY) EOR CCCC,KEY) |
| B→C→A | f(BBBB,KEY) | f( f(BBBB,KEY) EOR CCCC,KEY) | f( f( f(BBBB,KEY) EOR CCCC,KEY) EOR AAAA,KEY) |
| C→A→B | f(CCCC,KEY) | f( f(CCCC,KEY) EOR AAAA,KEY) | f( f( f(CCCC,KEY) EOR AAAA,KEY) EOR BBBB,KEY) |
| C→B→A | f(CCCC,KEY) | f( f(CCCC,KEY) EOR BBBB,KEY) | f( f( f(CCCC,KEY) EOR BBBB,KEY) EOR AAAA,KEY) | ns
INFORMATION RECORDING MEDIUM, AND PROCESS MANAGEMENT APPARATUS AND PROCESS MANAGEMENT SYSTEM USING THE INFORMATION RECORDING MEDIUM

INCORPORATION BY REFERENCE

The present application claims priority from Japanese application JP2007-108809 filed on Apr. 18, 2007, the content of which is hereby incorporated by reference into this application.

BACKGROUND OF THE INVENTION

1. Field of the Invention

This invention relates to information recording medium used by object products that pass through a plurality of processes, and a process management apparatus and a process management system of the object products each using the information recording medium.

2. Description of the Related Art

Process management apparatuses and process tracking apparatuses directed to use information recording media having a communication distance of several meters and capable of simultaneously recognizing dozens of products, such as tags called "RFID tags", for supply chain management and article management in the fields of physical distribution and merchandising have been proposed in the recent years.

A system disclosed in JP-A-2003-316861 reads product identification information and communication destination address information recorded to an RFID tag attached to a product when the product is inputted to a process of its own, reports input of the product indicated by the product identification information while keeping coordination with identification information of the apparatus of its own, reads the product identification information recorded to the RFID tag attached to the product and the communication destination address information when the product is outputted from the process of its own and reports output of the product indicated by the product identification information while keeping coordination with the identification information of the apparatus of its own. The circulation status of the individual products can be grasped by collecting these reports.

SUMMARY OF THE INVENTION

According to the technology disclosed in the patent document described above, it is possible to read out the information recorded to the RFID tag by a process management apparatus when a product as an object passes through each process and to monitor and manage the flow of production processes which otherwise diverge into a plurality of flows and gather together into one process in a complicated way by outputting the information read to a process tracking apparatus.

The construction described above requires a process management apparatus that can be connected to the process tracking apparatus and has the function of outputting information necessary for tracking the processes through which the object product has passed, in each of the production and distribution processes.

To realize a method for tracking the movement path of the product, it is necessary to install process management apparatuses in all the processes of the product and process tracking apparatuses for building up the information outputted from the process management apparatuses. Furthermore, all the process management apparatuses must be connected to the process tracking apparatuses and the installation cost becomes inevitably enormous.

It is an object of the invention to avoid as much as possible the installation of setup requiring an enormous cost in production and distribution processes of products but to make it possible to track the processes through which the object products have passed.

A process management apparatus according to one aspect of the invention includes a data transmission/reception unit for executing data transmission/reception to and from an information recording medium; a process data generation unit for generating process data representing a process; and a process pass certificate data generation unit for generating process pass certificate data representing the passage through a process from the process data representing the process; wherein the data transmission/reception unit executes transmission/reception of the process data and the process pass certificate data to and from the information recording medium.

The process management apparatus described above generates the process pass certificate data by using identification data recorded to the information recording medium, too.

The process management apparatus described above generates the process pass certificate data by using key data that is the same or different for each process.

The process management apparatus described above transmits command data for setting or releasing inhibition of read of data from the information recording medium or inhibition of write of data to the information recording medium.

The process management apparatus described above further includes a process order data storage unit for representing an nth data of process data; wherein the process pass certificate data generation unit generates the nth data of process pass certificate data from at least the nth data of the process data and the (n−1)th data of the process pass certificate data and transmits it to the information recording medium.

The process management apparatus described above further includes a process verification unit for comparing the process pass certificate data stored in the information storage medium after passing through a plurality of processes with the process pass certificate data for verification that is generated in accordance with the processes through which the information recording medium passes, and judges that the information recording medium has passed through the route processes when the comparison result proves coincident.

The term "pass through correct processes" is hereby used to mean that the process pass certificate data or the process pass certificate data for verification represents the processes through which the information recording medium has passed practically.

The process management apparatus according to the invention makes it possible to verify whether or not object products using an information recording medium RFID tag have passed through correct processes by utilizing a data storage unit of the information recording medium RFID tag.

By employing the process management apparatus according to the invention, the management apparatus and the process tracking apparatus that are connected to all the process management apparatuses need not always be installed. Altering of the data of the information recording medium RFID tag, if any, can be detected, too.

The invention can provide a process management apparatus, or a process management system, having higher reliability than the prior art apparatuses.

BRIEF DESCRIPTION OF THE DRAWINGS

FIG. 6 shows a process code that each of three processes has;

FIG. 7 shows a memory construction of the information recording medium RFID tag and a data specification in the embodiment of the invention;

FIG. 11 shows a content of data stored in the information recording medium RFID tag after the information recording medium RFID tag passes through three processes;

FIG. 12 shows a flow for generating process pass certificate data for verification so as to verify the process pass certificate data in a process verification unit;

FIG. 15 shows a process code that each process has;

FIG. 18 shows a content of data stored in the information recording medium after the information recording medium RFID tag passes through five processes;

FIG. 22 shows the process pass certificate data of route patterns of all processes.

DESCRIPTION OF THE EMBODIMENTS

Preferred embodiments of the invention will be explained dividedly in the following manner. To begin with, a construction in which an RFID tag as an information recording medium passes through a plurality of processes will be explained with reference to FIG. 1. Constructions of an external communication equipment reader-writer and an information recording medium RFID tag will be explained with reference to FIGS. 2 to 4. A method for tracking the processes through which the RGID tag passes will be explained with reference to FIGS. 5 to 13. Furthermore, a method for tracking processes using a management apparatus of network connection will be explained with reference to FIGS. 14 to 20. Finally, a method for improving security and utility will be explained with reference to FIGS. 21 and 22.

Embodiment 1

Figure 1:
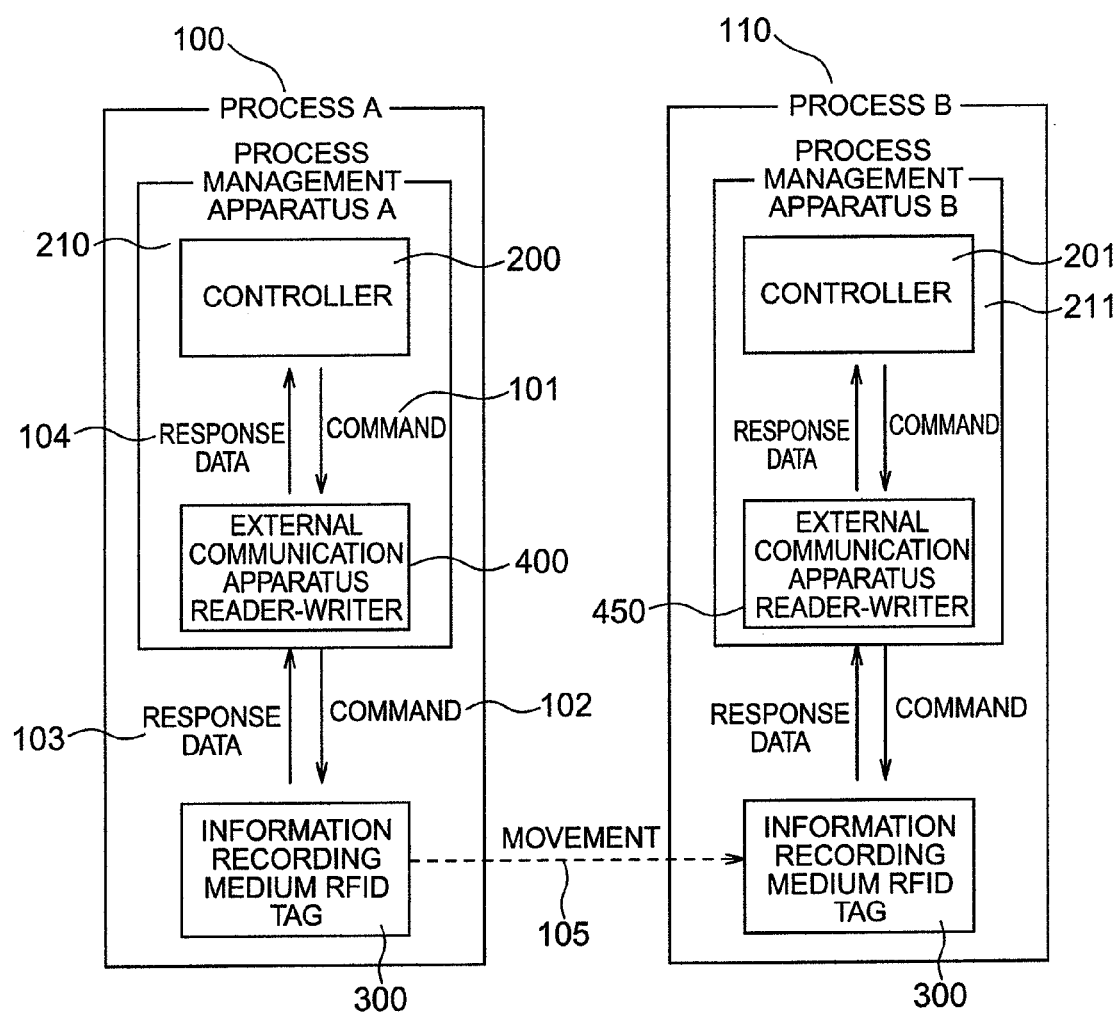
FIG. 1 shows process management apparatuses and moving information recording medium RFID tags in two processes in an embodiment of the invention.

FIG. 1 shows process management apparatuses in two processes and an information recording medium that moves in the two processes in an embodiment of the invention.

The information recording medium RFID tag 300 will be hereinafter called "RFID tag 300". The RFID tag 300 moves (105) from a process A100 to a process B110. A process management apparatus A210 in the process A100 includes a controller 200 and an external communication equipment reader-writer 400. The external communication equipment reader-writer 400 will be hereinafter called "reader-writer 400".

A process management apparatus B211 in the process B110 includes a controller 201 and a reader-writer 450.

The reader-writer 400 and the reader-writer 450 execute read and write of the data of the RFID tag 300 and transmits and receives commands for executing the functions of the RFID tag 300.

The controller 200 and the controller 201 control the reader-writer 400 and the reader-writer 450, respectively, generate and manage the data to be written to the RFID tag 300 and process and manage the data read. Though only two processes are described for the sake of illustration and explanation, a plurality of processes having substantially the same construction are installed and the RFID tag 300 passes through these processes. Therefore, the process management apparatus A210 and the process management apparatus B211 have the same construction and the same function.

When the RFID tag 300 passes through the process A100, the controller 200 issues a command 101 for controlling the reader-writer 400 to the reader-writer 400 to read and write the data from and to the RFID tag 300. Receiving the command 101, the reader-writer 400 transmits a command 102 for executing the command received from the controller 200, read and write of the data of the RFID tag 300, lock of a memory area and other processing.

When receiving the command 102, the RFID tag 300 returns the execution result of the command 102 such as the read or write result from the RFID tag 300 as response data to the reader-writer 400.

The reader writer 400 processes the execution result to the RFID tag 300 and returns the processing result to the controller 200. The controller 200 stores the response data 104, processes the response data 104 and transmits the result of processing to the external equipment.

The information recording medium 300 moves to the process B110 when a series of processing are completed in the process A100. The process B110 has the same construction as the process A100 and includes a controller 201 and an external communication equipment reader-writer 401. The explanation of its processing will be omitted because it is the same as that of the process A100.

This embodiment represents the case having two processes, that is, the process A and the process B. However, the construction may include two or more processes and the moving route of the information recording medium 300 may be branched or the medium 300 may pass two or more times through the same process.

Figure 2:
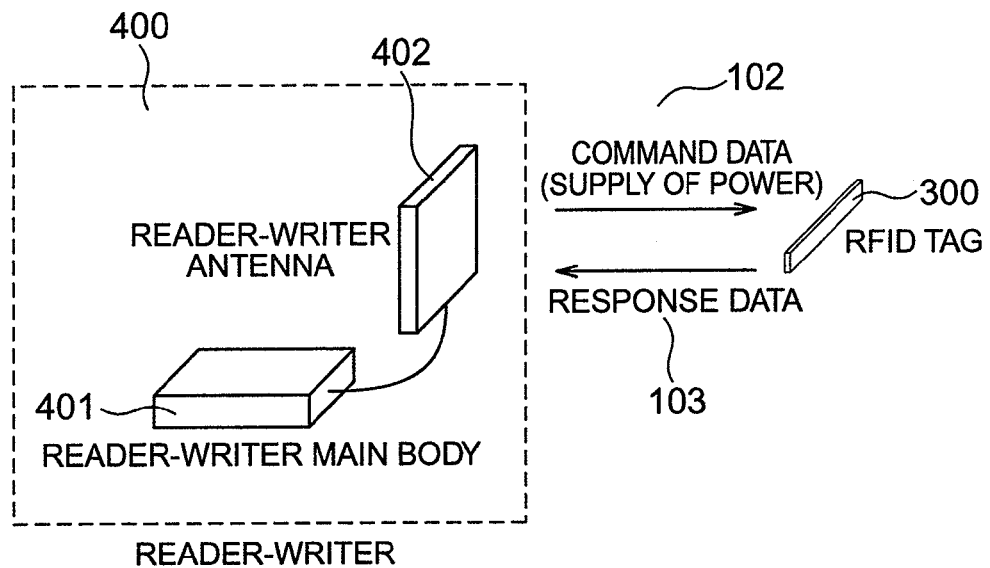
FIG. 2 shows a construction of an RFID tag system including an information recording medium RFID tag and an external communication equipment reader-writer.

FIG. 2 shows a construction of an RFID tag system including an RFID tag 300 and a reader-writer 400. The reader-writer 400 has a reader-writer main body 401 and a reader-writer antenna 402. Transmission of command data 102 and supply of power are made to the RFID tag 300 through radio waves and the reader-writer 400 receives response data 103 as a response from the RFID tag 300.

Figure 3:
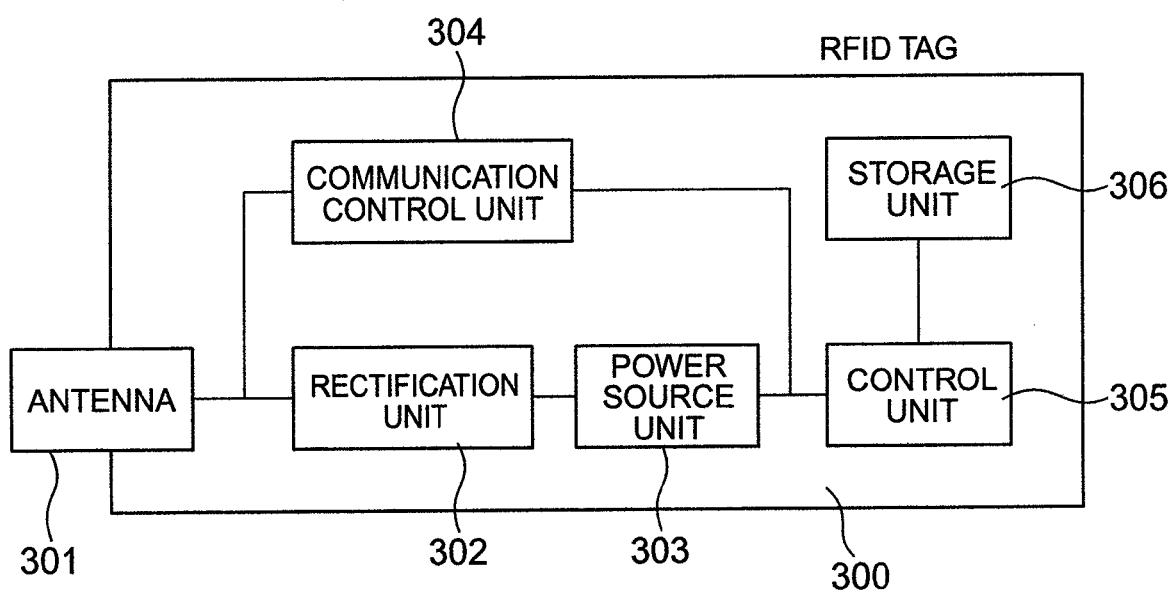
FIG. 3 is a block view that shows an internal construction of the information recording medium RFID tag.

FIG. 3 is a block view showing an internal construction of the RFID tag 300. The RFID tag 300 includes an antenna 301 that receives the radio wave from the reader-writer as the external communication equipment and executes transmission and reception of signals and data with the reader-writer, a rectification unit 302 that rectifies the radio wave received from the antenna 301, a power source unit 303 that supplies power to each unit, a communication control unit 304 having a communication method that amplifies and demodulates signals at the time of reception of the command data, modulates response data at the time of transmission and controls these transmission/reception operations, a control unit 305 having a processing procedure that demodulates the reception signal and the command data and executes the function of the RFID tag 300 and access control to each data item, and generates response data responsive to the reader-writer, and a memory unit 306 that stores ID and other information and set values of the RFID tag.

Figure 4:
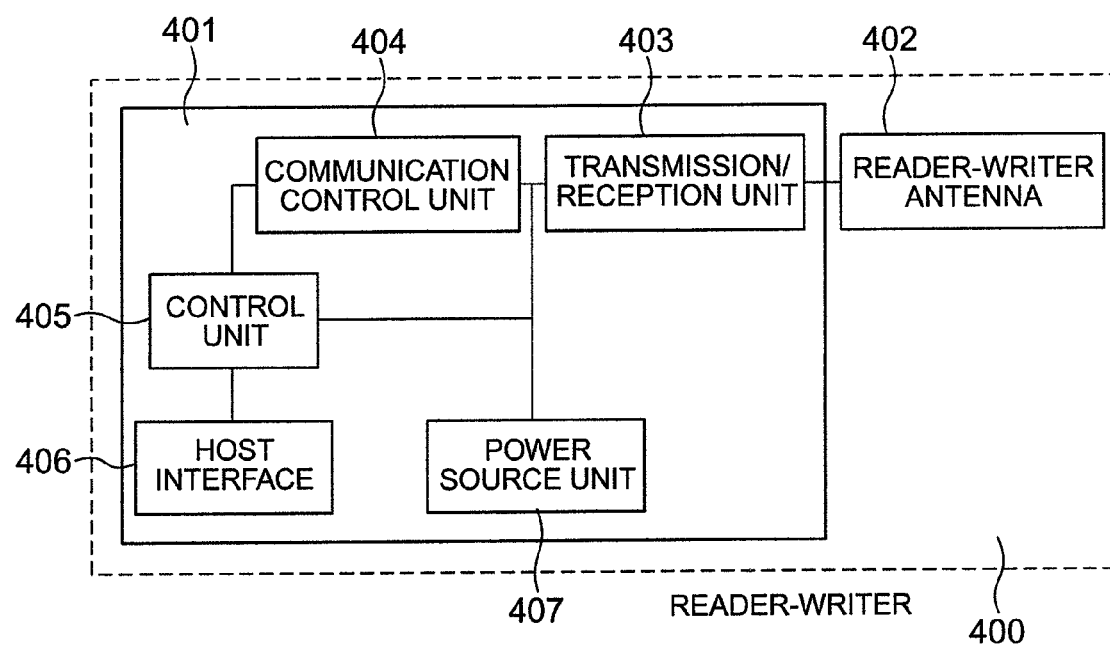
FIG. 4 is a block view that shows an internal construction of an external communication equipment reader-writer.

FIG. 4 shows an internal construction of the reader-writer 400. The reader-writer 400 includes a reader-writer main body 401 and a reader-writer antenna 402 for transmitting radio waves and command data to the RFID tag and for receiving a response from the RFID tag. The reader-writer main body 401 includes a transmission-reception unit 403 that transmits the command data to the RFID tag and receives its response by using the reader-writer antenna 402, a communication control unit 404 having a communication method for modulating signals at the time of transmission of the command data, amplifying and demodulating the signals at the time of reception, and executing control, a control unit 405 for controlling the reader-writer as a whole, a host interface 406 for executing communication of data and operation commands with the reader-writer main body 401, the controller and the external communication equipment such as a personal computer and a power source unit 407 for supplying power source to each unit. Examples of the command transmitted from the reader-writer 400 to the RFID tag are a read command when the ID or the RFID tag or the data of the memory is read, a write command when the data is written to the memory of the RFID tag and a lock command when read and write of the data from and to the memory of the RFID tag are inhibited.

Next, a method for verifying whether or not those products to which the RFID tag is attached pass through correct processes when they pass through a plurality of processes, by using the RFID tag and the system having the construction shown in FIG. 1, will be explained with reference to FIGS. 5 to 13. First, the processing executed for the RFID tag when it passes through each process will be explained with reference to FIGS. 5 to 10.

Figure 5:
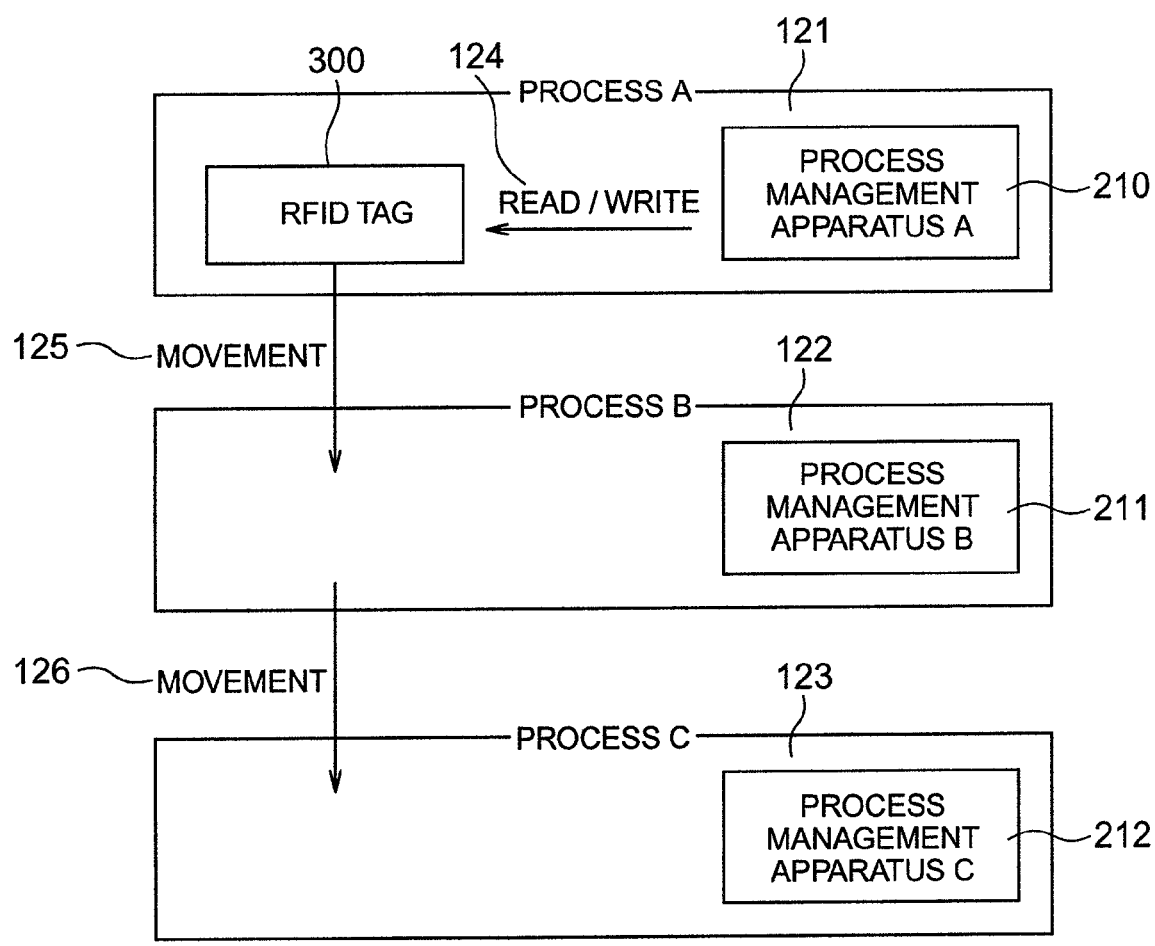
FIG. 5 shows a construction in which the information recording medium RFID tag passes through three processes.

FIG. 5 shows a construction in which the RFID tag passes through three processes. The internal construction of the process management apparatus that is shown in FIG. 1 is omitted from illustration. Each of the process A121, the process B122 and the process C123 has a process management apparatus having the same construction. The RFID tag 300 passes through the process A121, the process B122 and the process C123 in this order. First, when the RFID tag 300 passes through the process A121, the process management apparatus 210 executes read and write operations 124 from and to the RFID tag 300. A processing method of the data read and a generation method as well as processing method of data to be written will be explained with reference to the later-appearing FIGS. 6 to 8.

Next, the RFID tag 300 moves (125) to the process B122. The process management apparatus 211 executes read and write operations of data from and to the RFID tag 300 in the same way as the process A121. The RFID tag 300 then moves to the process C123. In the process C123, too, the process management apparatus 212 executes read and write operations of data from and to the RFID tag 300 in the same way as the process A121 and the process B122.

The execution content of read and write of data from and to the RFID tag in each process will be explained with reference to FIGS. 6 to 10.

FIG. 6 shows a process code that each of the processes A, B and C shown in FIG. 5 has. Each process management apparatus has a different process code 130. Each process code may be held by an external apparatus connected to the process management apparatus. Preferably, each process management apparatus has at least a process code of its own. The process code 130 represents the process and is, for example, a management code determined for each process or a code representing the site of the process. The process code may be any as long as the code value is not the same as other process. It will be assumed in this example that the process code 130 of the process A121 is AAAA131, the process code 130 of the process B122 is BBBB132 and the process code 130 of the process C123 is CCCC133. The code 130 of each process becomes necessary to verify whether or not the RFID 300 has passed through correct processes. A verification method will be explained elsewhere with reference to FIGS. 11 to 13.

FIG. 7 shows a construction of the memory of the RFID tag 300 and an example of the data specification in the embodiment of the invention. The RFID tag 300 has four kinds of memory banks (RESERVED321, UII322, TID323, USER328). The size 330 of each memory bank 320 and storage data 340 will be explained.

A password 341 of a 32-bit size for gaining and locking the access to the memory of the RFID tag 300 is stored in the RESERVED321.

An ID as identification data of a 128-bit unique to and set to each product to which the RFID tag 300 is attached is stored in the UII322.

An ID as identification data of a 32-bit unique to and set to each RFID tag 300 that is generally set during production of the RFID tag 300 is stored in the UII322.

The USER328 is an area to and from which a user can freely write, read or lock the data to the RFID tag 300. In this example, four USER328 exist.

In this embodiment of the invention, the USER1324, the USER2325 and the USE3326 are used to store the process code of each process explained with reference to FIG. 6. Process pass certificate data 347 for verifying whether or not the RFID tag has passed through the correct processes is stored in the USER4. Whether or not the RFID tag 300 as the object has passed through the correct processes can be verified by verifying the process pass certificate data 347 after the passage of the tag through the processes.

A generation method of the process pass certificate data 347 will be explained with reference to FIG. 8. The embodiment has the memory construction, the size and the USER areas shown in FIG. 7 but other memory construction and other memory size may be employed as long as a plurality of USER areas to and from which the user can freely write and read the data exists. Alternatively, it is possible to divide one USER area into a plurality of areas so as to virtually achieve a plurality of USER areas.

FIG. 8 shows a processing for generating the process pass certificate data. The process pass certificate data is data that is generated for each process when the RFID tag 300 passes through a plurality of processes and is overwritten to the USER4. It becomes thus possible to verify whether or not the RFID tag 300 has passed through the correct processes by later verifying the process pass certificate data.

Figure 8A:
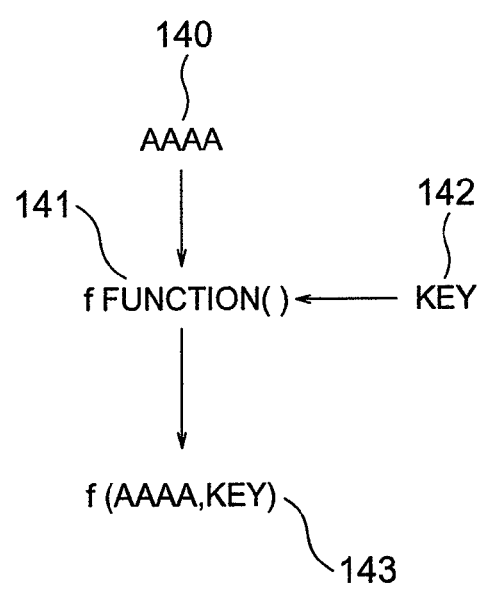
FIGS. 8A and 8B show a processing for generating process pass certificate data.

A verification method and its concrete example will be explained with reference to FIGS. 9 to 13. In FIG. 8A, a method for generating the process pass certificate data in the first process will be explained. The process code (here, AAAA140) of the process is acquired from the process management apparatus. A function f ( ) 141 has the function of operating and converting a certain value to another value having the same length. Examples of the function f ( ) 141 include an operation method that calculates input data by using a hash function represented by SHA-1 or MD5 and a method that encrypts the input data by using a cipher key (here, KEY142).

Here, the length of the input data is preferably the same as the length of the operation result data for the following reason. The memory size of the RFID tag is from dozens to hundreds of bytes and a writable data size is limited. When the length of the process pass certificate data is greater than the memory size of the RFID tag 300, it cannot be written to the memory of the RFID tag. Therefore, the size preferably has a predetermined length and is a writable size to the RFID tag. In the following explanation, the operation method using the function f ( ) 141 and the KEY142 will be explained because various methods for operating the input data are known.

The KEY142 may be the same or different for each process. The KEY142 is not used in some cases depending on the function f ( ) 141. The operation method will be hereinafter explained on the basis of a concrete example. The operation result of the input data, that is, the process code AAAA140, using the function f ( ) 141 and the KEY142 will be expressed as "f (AAAA, KEY) 143". This value f (AAAA, KEY) 143 is the process pass certificate data when the RFID tag passes through a certain process and is written to the USER4327 of the memory of the RFID tag 300.

Figure 8B:
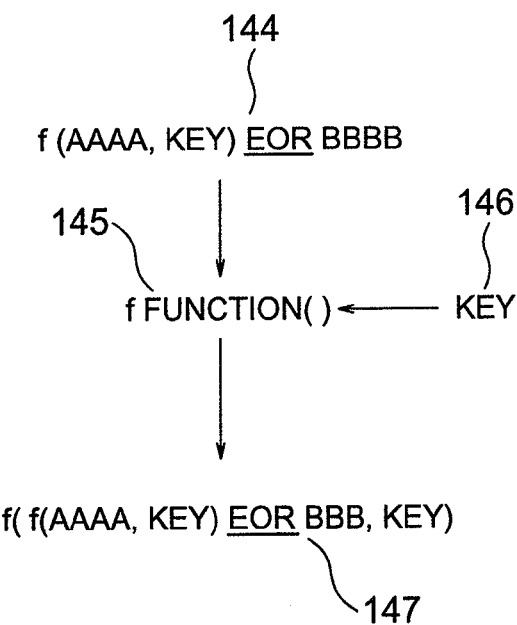

Next, the generation method of the process pass certificate data when the RFID tag enters the next process will be explained with reference to FIG. 8B. The process pass certificate data f (AAAA, KEY) 143 stored in the USER4327 of the RFID tag 300 and generated in the preceding process is acquired and exclusive- or is operated between the process pass certificate data and the process code BBBB. Hereinafter, exclusive- or will be called "EOR".

Here, as exclusive- or is operated, the data length of the input data and the exclusive- or result of the process code are the same. Methods other than exclusive- or may be employed but the length of the input data is preferably the same as that of the output data.

It will be assumed that f (AAAA, KEY) EOR BBBB144 is the input to the function f ( ) 145. When the function f ( ) 145 is converted by using the KEY146 in the same way as before, the result can be expressed as f (f (AAAA, KEY) EOR BBBB, KEY) 147. This value is the process pass certificate data when the RFID tag passes through the second process. The process pass certificate data is overwritten to the USER4327 of the RFID tag 300. This processing is likewise repeated in the subsequent processes. In this embodiment, the function f ( ) 141 is the same as the function f ( ) 145 and the KEY142 is the same as the KEY146. Different functions and different KEY may be used as long as it is possible to manage which functions and which KEY are used in which process.

Figure 9:
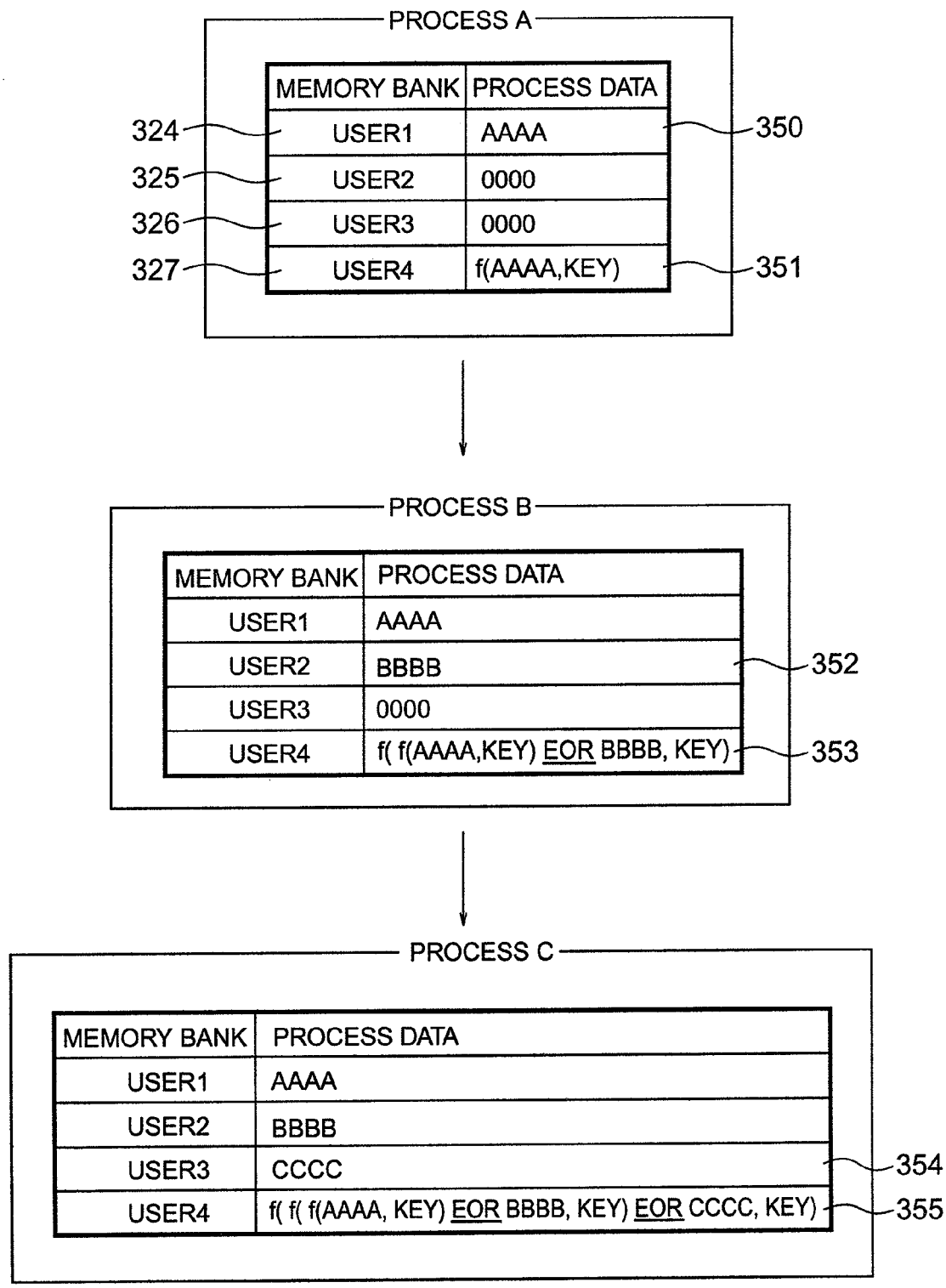
FIG. 9 shows a data content stored in the information recording medium RFID tag when the information recording medium RFID tag passes through processes.

FIG. 9 shows a content of the data of the RFID tag when the RFID tag explained with reference to FIG. 5 passes through a certain process. First, no data exists, or 0 is fully stored (hereinafter expressed as "0000"), in the USER1324, USER2325, USER3326 and USER4327 of the RFID tag 300. After the RFID tag 300 passes through the process A, AAAA350 as the process code of the process A is written to the USER1324. The process pass certificate data f (AAAA, KEY) 351 is determined by using the function f ( ) 145, the KEY146 and the process code AAAA of the process A explained with reference to FIG. 8 and is written to the USER4327. Because no preceding process exists in the first process, the process pass certificate data of the preceding process is not used and 0000 or an initial value may be set, as well. In such a case, the left-hand part of FIG. 8 is used for the first process.

After the RFID tag 300 passes through the process B, BBBB352 as the pass certificate code of the process B is written to the USER2325. Next, f (AAAA, KEY) as the process pass certificate data written to the USER4327 in the process A is read and f (f (AAAA, KEY) EOR BBBB, KEY) 353 is determined by using the function f ( ) 145, the KEY 146 and the process code BBBB352 of the process B and is overwritten to the USER4327.

After the RFID tag 300 passes through the process C, CCCC354 as the process code of the process C is written to the USER3326. Next, f (f (AAAA, KEY) EOR BBBB, KEY) 353 as the process pass certificate data written to the uSER4327 in the process B is acquired, the process pass certificate data f (f (f (AAAA, KEY) EOR BBBB, KEY) EOR CCCC, KEY) 355 is determined by using the function f ( ) 145, the KEY 146 and the process code CCCC354 of the process C and is overwritten to the USER4327.

Here, the process code is serially written to the USER1, USER2 and USER3 in each process but any order may be employed as long as it is possible to know which process data is written to which USER in which order. In this embodiment, the process data is serially written from the USER1. When the data is 0000, the data stored is serially confirmed from the USER1 by judging that nothing is written, and the process data is written to the area of 0000 that is first found out.

Another method stores data representing the storage position of the present process data in another USER area and acquires this data to know the write position/area of the process data. It is further possible to store the number of processes passed in another USER area, estimates the USER area to be written from that number and writes the process data.

Figure 10:
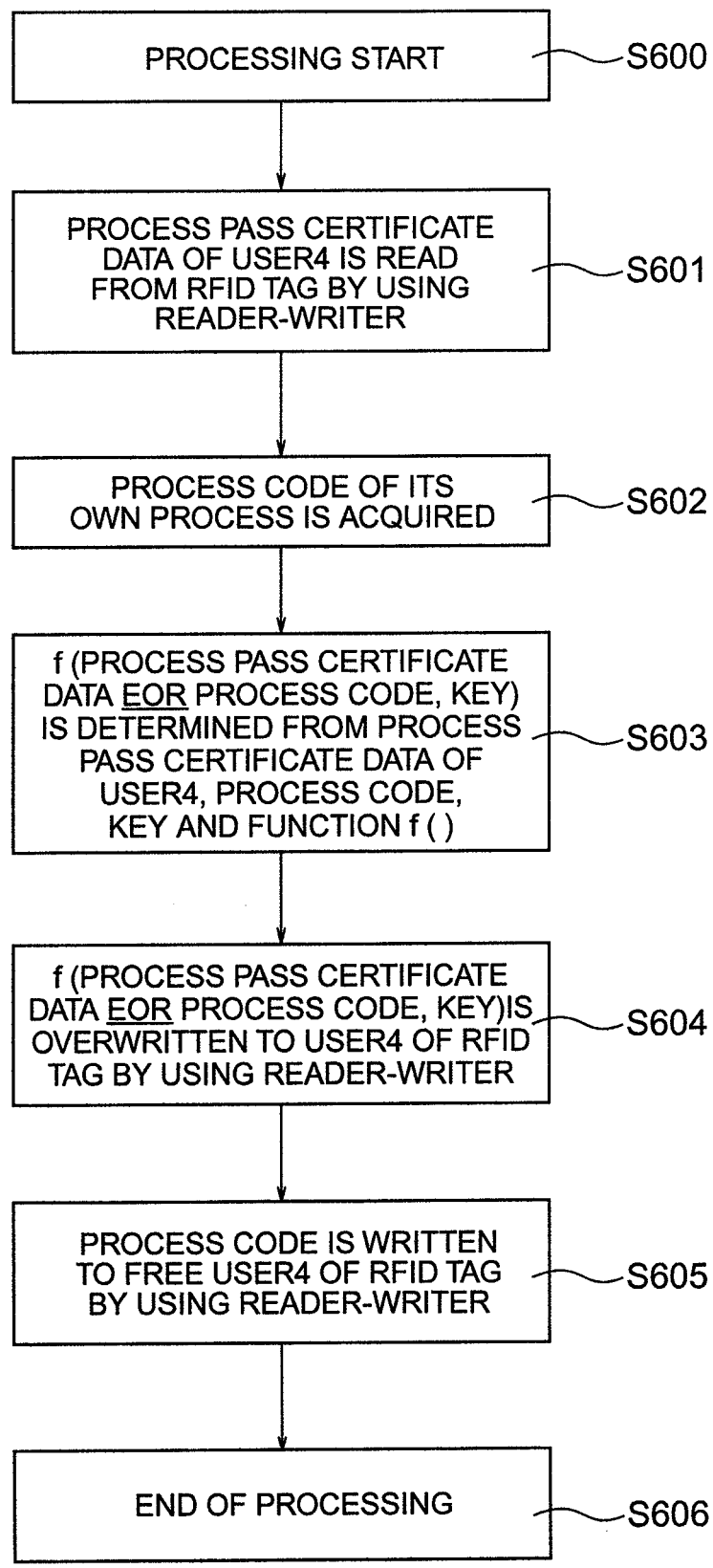
FIG. 10 is a flowchart showing a processing of a process management apparatus when a process code and process pass certificate data are written to the information recording medium RFID in a certain process.

FIG. 10 is a flowchart of the process management apparatus representing the process for writing the process code and the process pass certificate data to the RFID tag in a certain process. After the RFID tag 300 passes through the process of its own in step S600, the flow proceeds to step S601 to start processing.

As means for recognizing the passage of the RFID tag 300 through its own process, there are a method that detects products to which the RFID tag 300 is attached by using infrared rays or other sensors and a method that always repeats reading of the RFID tag 300 and recognizes the passage when the RFID tag 300 passes and its data can be acquired. According to still another method, an operator visually recognizes the entrance of the RFID tag 300 into an area in which the reader-writer of the process management apparatus and the RFID tag 300 can communicate with each other, and instructs the start of processing.

In step S601, the process pass certificate data stored in the USER4 of the RFID tag 300 is read by using the reader-writer of the process management apparatus and the flow proceeds to step S602. In the case of the first process, no data exists in the USER4 or in other words, 0000 is stored. In this case, it is possible to handle on the assumption that the process pass certificate data of the preceding process does not exist or the data is 0000. An initial value other than 0000 may be stored in advance in the USER4 and may be used to determine the process pass certificate data. In Step S602, the process code of the own process is acquired from the process management apparatus and the flow then proceeds to step S603.

In step S603, f (process pass certificate data EOR process code, KEY) is determined by using the process pass certificate data (nil in the case of 0000 or 0000 is used or initial value as predetermined value is used) acquired in step S601, the code of its own process acquired in step S602 and the function f ( ) and the KEY acquired from the process management apparatus. The flow then proceeds to step S604.

In step S604, f (process pass certificate data EOR process code, KEY) is overwritten to the USER4 of the RFID tag 300 by using the reader-writer of the controller, and the flow proceeds to step S605.

In step S605, the process code of its own process is written to a free USER of the RFID tag 300 by using the reader-writer of the controller and the flow proceeds to step S606. The method of searching the free USER may be the same as the method explained with reference to FIG. 9.

In step S606, the processing in its own process is completed and the RFID tag 300 then moves to the next process. A series of processing are executed for each process and for each RFID tag 300.

Next, a method for verifying whether or not those products to which the RFID tag is attached have passed through the correct processes by using the process pass certificate data generated in FIGS. 5 to 10 will be explained with reference to FIGS. 11 to 13.

FIG. 11 shows the data stored in the memory of the USER of the RFID tag 300 after the RFID tag 300 has passed through the process A, the process B and the process C as shown in FIG. 5.

The process data AAAA350 written in the process A is stored in the USER1324. The process data BBBB352 written in the process B is stored in the USER2325. The process data CCCC354 written in the process C is stored in the USER3326. The process pass certificate data f (f (f (AAAA, KEY) EOR BBBB, KEY) EOR CCCC, KEY) 355 generated and written in the last process C is stored in the USER4327.

It is possible to verify whether or not the RFID tag 300 has passed through the correct processes and whether or not the process pass certificate data has been altered, by verifying the process pass certificate data f (f (f (AAAA, KEY) EOR BBBB, KEY) EOR CCCC, KEY) 355.

To verify whether or not the process pass certificate data is correct, the order of the processes through which the RFID tag has passed and the process pass certificate data generated and written in the last process by using the process code of each process are determined provided that the RFID tag 300 has passed through the correct processes. Whether or not the process pass certificate data stored in the RFID tag is coincident with the process pass certificate data generated at the time of verification is verified. When they are coincident, it is possible to judge that the RFID tag has passed through the correct processes and when they are not, it is possible to judge that the RFID tag does not have passed through the correct processes or the process pass certificate data has been altered.

This verification may be executed by using the process pass certificate and the controller of the last or intermediate process or by using other external apparatus such as a personal computer. The apparatus that conducts this verification will be hereinafter called a "process verification unit" (not shown). The process verification unit is contained in the process management apparatus, the management apparatus or other external apparatus. Preferably, the process management apparatus or the external apparatus of the process to be verified is connected through a network and the process pass certificate data of the RFID tag and its process code can be acquired. Further preferably, the construction is such that the process data for each process, the function f ( ) and the KEY for generating the process pass certificate data and the process order when the RFID tag has passed through the correct processes can be acquired when verification is made.

FIG. 12 shows a flow for generating the process pass certificate data that is to be generated and written to the RFID tag in the last process in the process verification unit to verify the process pass certificate data when the RFID tag has passed through the correct processes.

First, the process pass certificate data generated and written to the USER4 of the RFID tag in each process is determined when the RFID tag has passed through the correct processes. The process pass certificate data is determined by the same method as the one that generates the process pass certificate data and writes it to the USER4 of the RFID tag when the RFID tag passes through a process.

The process code AAAA700 of the process A stored in the USER1 of the RFID tag is first read from the USER1. As long as the process is correctly executed for the USER1 in the process A, the process code to be written can be estimated. Therefore, the process code of the process A of the RFID tag may be stored in advance in the process management apparatus or the process verification unit and may be acquired from them. The process pass certificate data f (AAAA, KEY) 701 generated when the RFID tag passes through the process A is determined by using the code AAAA700 so obtained, the function f ( ) and the KEY.

Since the RFID tag moves from the process A to the process B in the correct route, the process pass certificate data written to the RFID tag is generated in the process B. The process pass certificate data f (f (AAAA, KEY) EOR BBBB, KEY) generated in the process B is determined by using the process code BBBB702, the function f ( ), the KEY and the process pass certificate data of the preceding process A in the same way as in the process A.

Next, the process pass certificate data f (f (f (AAAA, KEY) EOR BBBB, KEY) EOR CCCC, KEY) generated in the process C is likewise determined by using the process code CCCC704, the function f ( ), the KEY and the process pass certificate data of the preceding process B. Whether or not the RFID tag has passed through the correct processes can be verified by verifying whether or not this process pass certificate data is coincident with the process pass certificate data stored in the USER4 of the RFID tag shown in FIG. 10.

Figure 13:
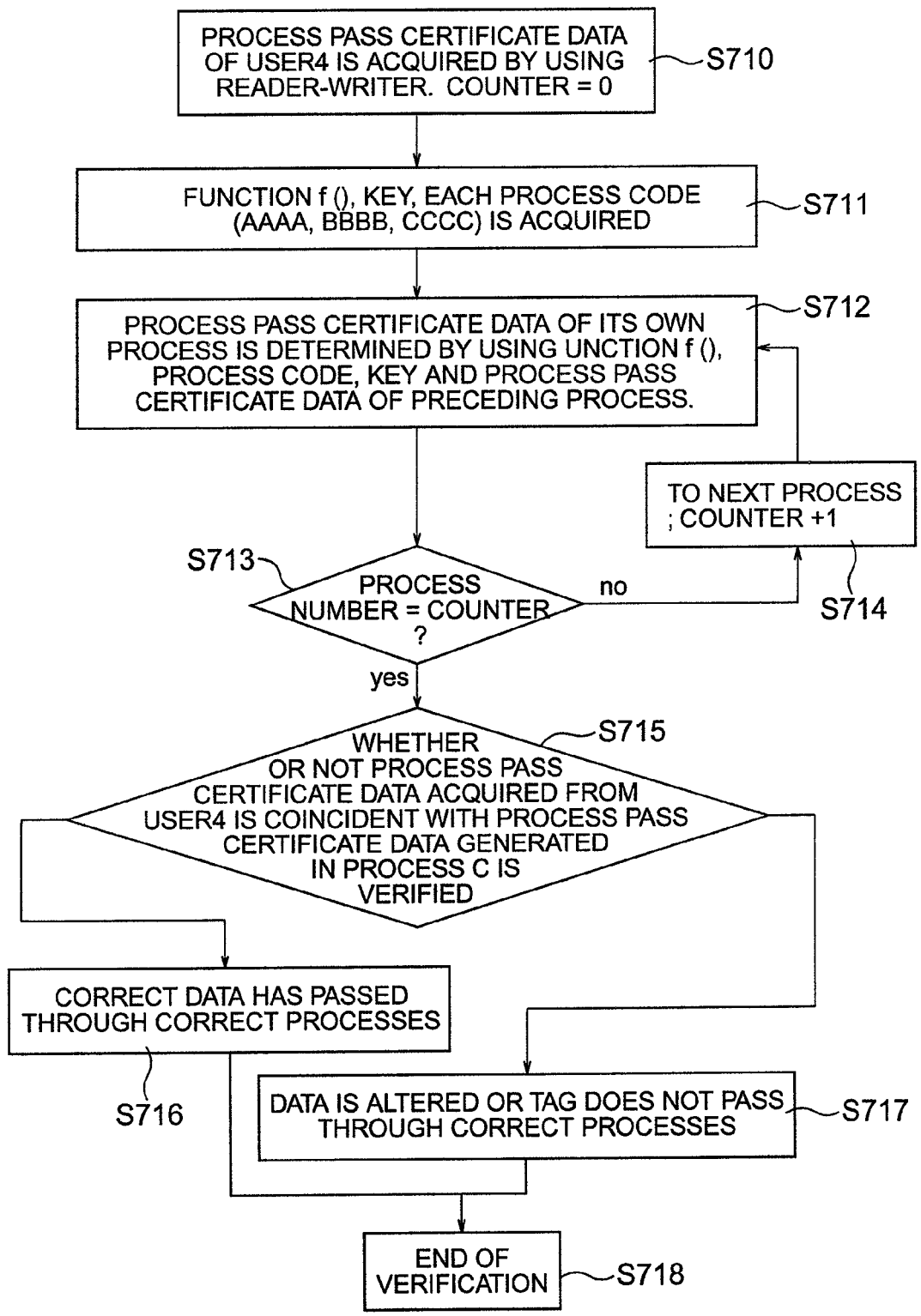
FIG. 13 is a flowchart showing a processing for verifying the process pass certificate data of the information recording medium RFID tag in the process verification unit.

FIG. 13 shows a flowchart of the process verification unit for verifying the process pass certificate data of the RFID tag explained with reference to FIG. 12. In step S710, the process pass certificate data stored in the USER4 of the RFID tag is read by using the reader-writer of the process management apparatus, 0 is set to a counter for counting the process number and the flow proceeds to step S711. The process pass certificate data of the RFID tag may be read from the RFID tag at the time of verification or may be acquired in advance and stored in the process management apparatus or the external apparatus or the process verification unit so as to acquire it at the time of verification.

The function f ( ), the KEY and the process codes AAAA, BBBB and CCCC for the respective processes are acquired in step S711 and the flow proceeds to step S712. The function f ( ) and the KEY are in advance stored in the process management apparatus or the external apparatus or the process verification unit and are acquired from them. The process code for each process may be acquired from the USER1 to USER3 of the memory of the RFID tag at the time of verification. Alternatively, the data of the USER1 to USER3 is in advance stored in the process management apparatus or the external apparatus or the process verification unit and may be acquired for verification. Since the order of the processes through which the RFID tag passes can be estimated, the data may be stored in advance in the process management apparatus or the external apparatus or the process verification unit and may be acquired from them for verification.

In step S712, the process pass certificate data generated in the process of its own is determined by using the function f ( ) and the KEY, the process code of its own and the process pass certificate data generated in the preceding process acquired in step S711 and the flow proceeds to step S713. When no preceding process exists, the process pass certificate data of the preceding process is nil or 0000 or an initial value set in advance. In step S713, the value of the counter is compared with the process number. When they are coincident, the flow proceeds to step S715 and when they are not, the flow proceeds to S714. The process number may be the number of the process data stored in the memory of the USER of the RFID tag or when the number of processes through which the RFID tag passes is known in advance, the process number may be acquired from it.

A value 1 is added to the counter value in step S714 and the flow proceeds to step S712 to execute the processing of the next process. In step S715, on the other hand, whether or not the process pass certificate data obtained in step S710 is coincident with the process pass certificate data generated in step S714 is verified.

The flow proceeds to step S716 when they are coincident. In step S716, this RFID tag is judged as having passed through the correct processes with the correct process pass certificate data and the flow proceeds to step S718.

When the process pass certificate data are not coincident in step S715, on the other hand, the flow proceeds to step S717. In this step S717, the process pass certificate data of this RFID tag is judged as being altered or having not passed through the correct processes and the flow proceeds to step S718. Verification is completed in step S718. The verification result may be either transmitted to the external apparatus or displayed on a display.

Here, since the memory size of the RFID tag is generally from dozens to hundreds of bytes in most cases, the area for storing the process code is limited and verification of the passage through the processes can be made for only a few memories that can be stored. Therefore, a method for verifying the passage of the RFID tag through the processes exceeding the storable number of process codes of the RFID tag will be hereby explained.

When no free space exists any more in the memory of the RFID tag, the content of the RFID tag is built up in a management apparatus or an external apparatus different from the process management apparatus by using a network, or the like. When the process management apparatuses of all the processes are connected to one management apparatus, the data of the RFID tag and the processing result are transmitted to the management apparatus for each process so that the management apparatus can altogether manage them. Since the construction in which all the process management apparatuses are network-connected to one management apparatus is difficult to achieve cost-wise, however, preferred is the construction in which the method for storing the process codes in the RFID tag and the method for transmitting the process codes to the management apparatus in the case of network-connected process management apparatuses are combined with each other.

A process management method in a system including a plurality of processes and one management apparatus wherein the process management apparatuses of some processes are connected to the management apparatus through a network will be explained.

Figure 14:
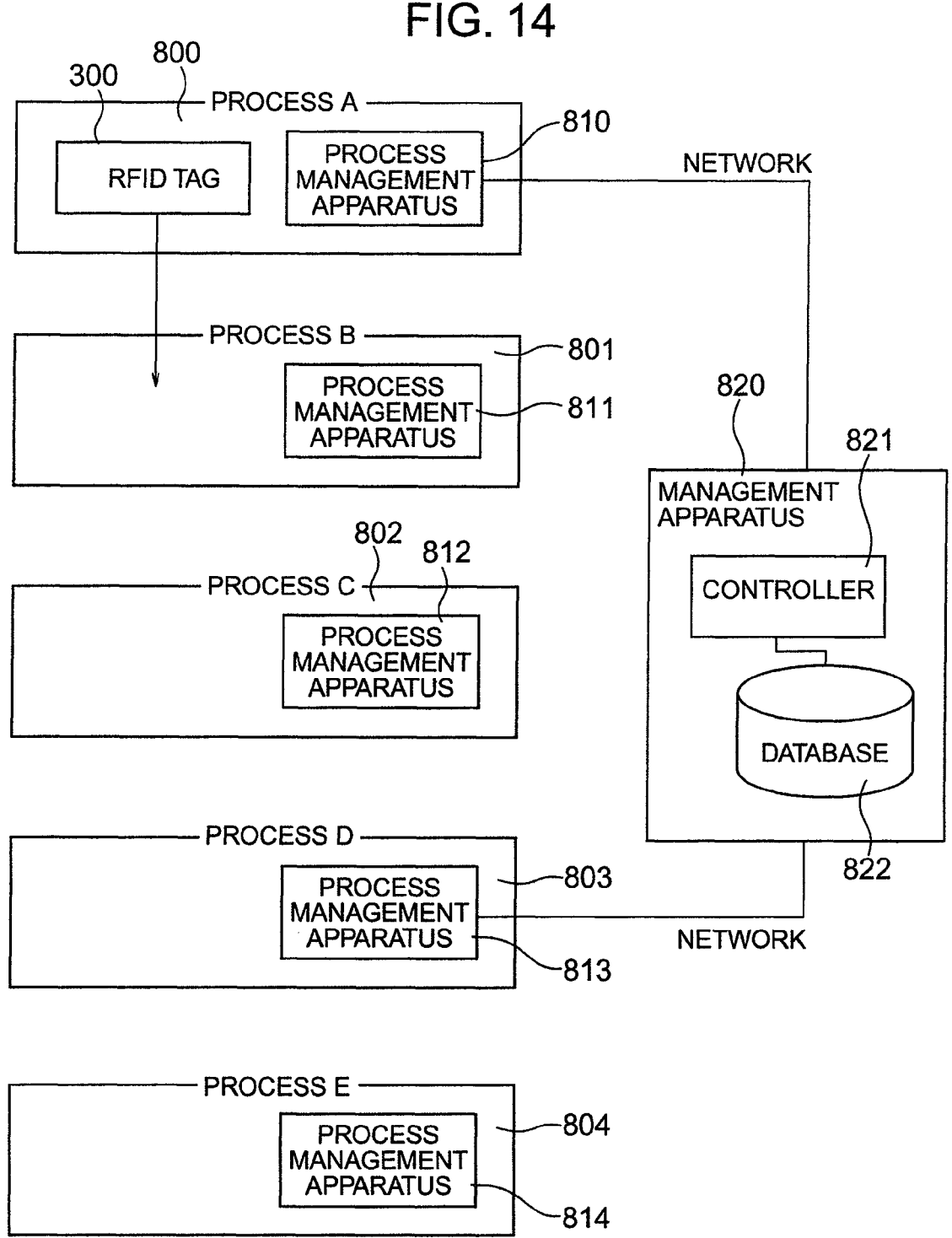
FIG. 14 shows a system including five processes and a management apparatus.

FIG. 14 shows a system that includes five processes and a management apparatus. The construction of each process and its function are the same as those explained with reference to FIG. 5. A management apparatus 820 having a controller 821 and a database 822 is added and a process management apparatus 810 of a process A800 and a process management apparatus 813 of a process D803 are connected to the management apparatus 820 through a network so that the data transmission and reception can be made.

When the RFID tag 300 passes through the process A800, the process management apparatus 810 executes write or read to or from the RFID tag 300. Because the process management apparatus 810 is connected to the management apparatus 820 through the network, data transmission and reception can be made to and from the controller 821 of the management apparatus 820 and data can be stored to and acquired from the database 822. The RFID tag 300 then moves to the process B801. In the process B801, the process management apparatus 811 similarly executes write and read to and from the RFID tag 300 and the RFID tag 300 moves thereafter to the process C802.

In the process C802, the process management apparatus 812 similarly executes write and read to and from the RFID tag 300 and the RFID tag 300 moves thereafter to the process D803.

In the process D803, the process management apparatus 813 similarly executes write or read to and from the RFID tag 300 and the RFID tag 300 moves to the process E804. Because the process management apparatus 813 of the process D803 is connected to the management apparatus 820 through the network in the same way as the process management apparatus 810 of the process A, data transmission and reception can be made similarly. In the process E804, the process management apparatus 814 similarly executes write and read to and from the RFID tag 300.

Next, a method of writing the process pass certificate data and the process code to the RFID tag in the construction shown in FIG. 14 will be explained.

FIG. 15 shows the process code that each process has. The process A800 has a process code AAAA830. The process B801 has a process code BBBB831. The process C802 has a process code CCCC832. The process D has a process code DDDD833. The process E has a process code EEEE34. Each process code may be held by the process verification unit connected to the process management apparatus or the external apparatus. Each process preferably has at least the process code of its won.

Figure 16:
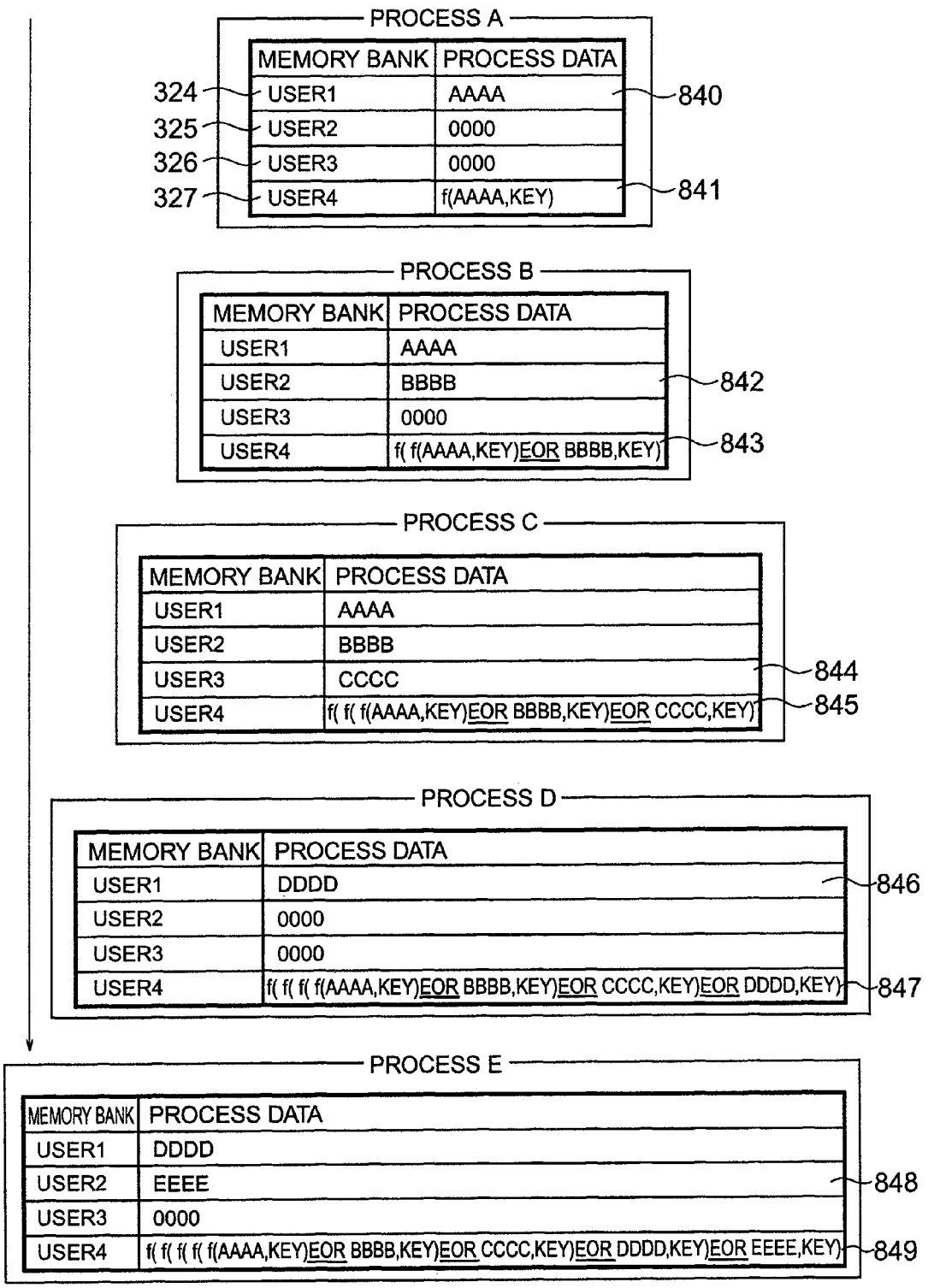
FIG. 16 shows a content of data stored in the information recording medium RFID tag.

FIG. 16 shows the content of the data of the RFID tag 300 when it passes through the processes explained with reference to FIG. 14. Detailed explanation of the generation method of the process pass certificate data will be omitted because it is the same as the method shown in FIG. 9.

First, no data exists in USER1 324, USER2 325, USER3 326 and USER4 4327 of the RFID tag 300, that is, 0000 is stored. After the RFID tag 300 passes through the process A, the process code AAAA 840 of the process A is written to the USER1 324. The process pass certificate data f (AAAA, KEY) 841 is determined by using the function f ( ) 145 and the KEY 146 explained with reference to FIG. 8 and the process code AAAA of the process A and is written into the USER4 327.

After the RFID tag 300 passes through the process B, the process code BBBB 842 of the process B is written to the USER2 325. The data f (f (AAAA, KEY) EOR BBBB, KEY) is determined by using the function f ( ) 145, the KEY 146, the process code BBBB of the process B and the process pass certificate data written to the USER4 327 in the process A and is overwritten to the USER4 327.

After the RFID tag 300 passes through the process C, the process code CCCC 844 of the process C is written to the USER3 326. The data f (f (f (AAAA, KEY) EOR BBBB, KEY) EOR CCCC, KEY) is determined by using the function f ( ) 145, the KEY 146, the process code CCCC of the process C and the process pass certificate data written to the USER4 327 in the process B and is overwritten to the USER4 327.

After the RFID tag 300 passes through the process D, the process code DDDD 846 of the process D is to be written to the USER1 324. However, the data has already been written to the USER1 to the USER3 in the processing up to the process C and no free space exists. Consequently, the process code of the process D cannot be written. Since the process management apparatus of the process D is connected to the management apparatus through the network, the contents stored in the USER1 324, the USER2 325 and the USER3 326, AAA 840, BBBB 842 and CCCC 844 are transmitted to the management apparatus and are built up in the database. The content of the USER1 324, the USER2 325 and the USER3 326 is erased. In other words, 0000 is written. Because the free space to which data can be written is created in this way, the process code of the process D can be written to the USER1.

Data f (f (f (f (AAAA, KEY) EOR BBBB, KEY) EOR CCCC, KEY) EOR DDDD, KEY) is determined by using the function f ( ) 145, the KEY 146, the process code DDDD of the process D and the process pass certificate data written to the USER4 327 in the process C and is overwritten to the USER4 327.

After the RFID tag 300 passes through the process E, the process code EEEE 848 of the process E is written to the USER2 325. Data f (f (f (f (f (AAAA, KEY) EOR BBBB, KEY) EOR CCCC, KEY) EOR DDDD, KEY) EOR EEEE, KEY) is determined by using the function f ( ) 145, the KEY 146, the process code EEEE of the process E and the process pass certificate data written to the USER4 327 in the process D and is overwritten to the USER4 327.

Figure 17:
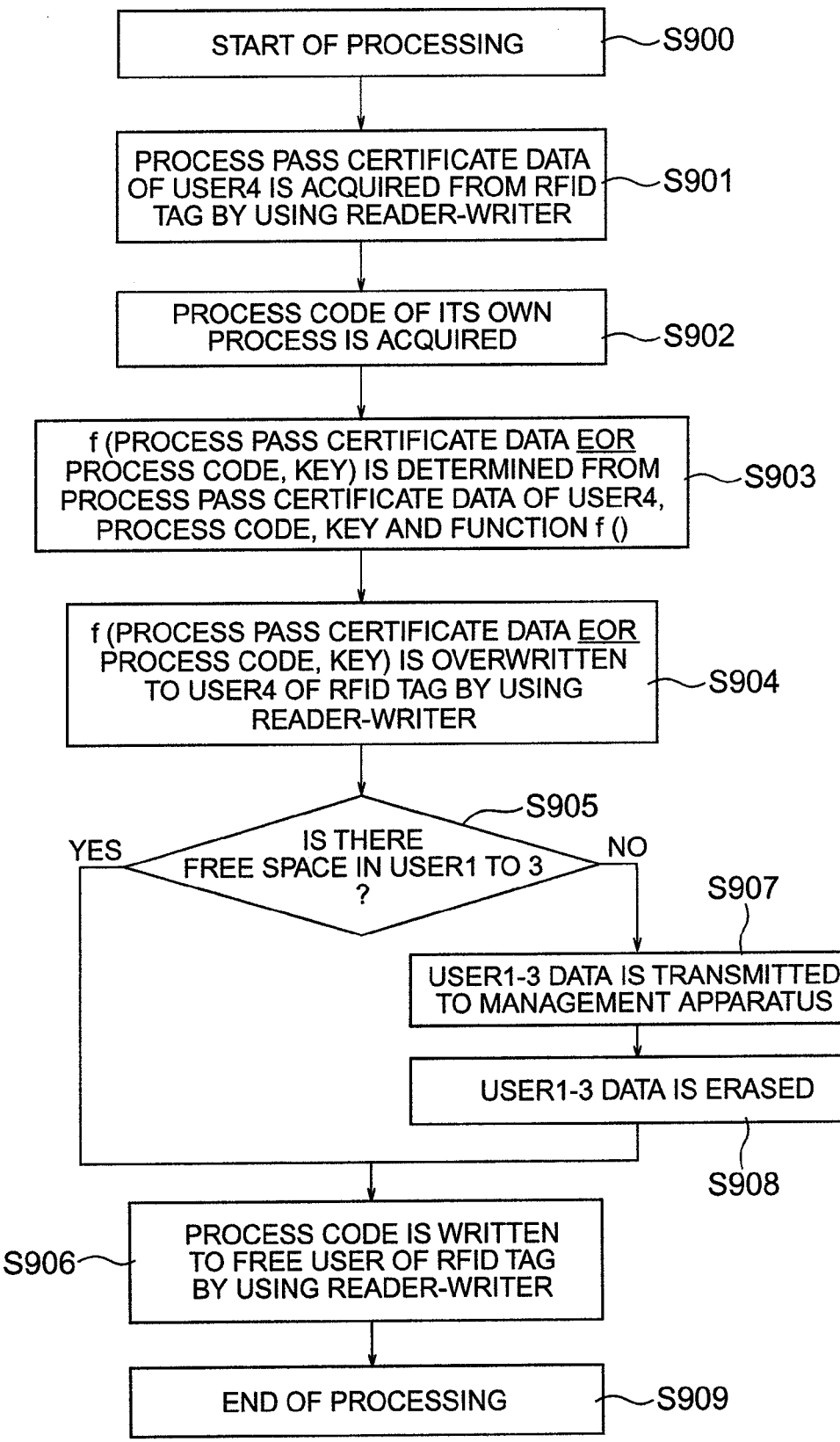
FIG. 17 is a flowchart showing a processing of a process management apparatus when the process management apparatus connected to the management apparatus writes the process code and the process pass certificate data to the information recording medium RFID tag and transmits data to the management apparatus.

FIG. 17 is a flowchart representing a processing of the process management apparatus when the process management apparatus writes the process code of each process and the process pass certificate data to the RFID tag and transmits the data to the management apparatus in the process in which the process management apparatus is connected to the management apparatus through the network. When the process management apparatus is not connected to the management apparatus through the network, the processing is executed in accordance with the flowchart shown in FIG. 10. Detailed explanation will be omitted about the process that is the same as the flow in FIG. 10.

Processing is started in step S900 and the flow proceeds to step S901. The starting method of the processing is the same as the starting processing shown in FIG. 10 and its explanation will be omitted. In step S901, the process pass certificate data of the preceding process stored in the USER4 is acquired from the RFID tag 300 by using the reader-writer of the process management apparatus and the flow proceeds to step S902. When no preceding process exists, the processing is executed on the assumption that no process exists, 0000 is stored or an initial value is used in the same way as in FIG. 10.

In step S902, the process code of its own process is acquired from the process management apparatus for the management apparatus connected through the network and the flow proceeds to step S903. In step S903, the process pass certificate data is determined by the process pass certificate data of the preceding process acquired in step S901, the process code acquired in step S902, the function f ( ) and the KEY and the flow proceeds to step S904.

In step S904, the process pass certificate data obtained in step S903 is overwritten to USER4 of the RFID tag 300 by using the reader-writer of the process management apparatus and the flow proceeds to step S905.

In step S905, whether or not the free space exists in the USER1 to USAER3 of the RFID tag 300 is searched. In other words, whether or not 0000 exists is searched. Here, when 0000 exists, the flow proceeds to step S906. In this step S906, the process code is written to the USER of 0000 by using the reader-writer of the process management apparatus and the flow proceeds to step S909.

On the other hand, when the free space exists in the USER1 to USER3, that is, when 0000 does not exist in step S905, the flow proceeds to step S907. In Step S907, the content of the USER1 to USER3 is acquired from the RFID tag 300 and is transmitted to the management apparatus connected through the network. The management apparatus stores the content sent in the database and the flow proceeds to step S908.

In step S908, the content of the USER1 to USER3 of the RFID tag is erased, that is, 0000 is written. The flow then proceeds to step S906. The processing is completed in step S909. Since the processing for the process management of a certain process is completed, the RFID tag 300 moves to the next process.

When the content of the USER1 to USER3 of the RFID tag are all written in FIGS. 16 and 17, the data of the USER1 to USER3 are all transmitted to the management apparatus and are all erased. However, a method that transmits only the oldest data among the data of the USER1 to USER3 to the management and erases only the USER transmitted may be employed, too. It is necessary in this case to know which data is the oldest among the data of the USER1 to USER3. For examples, there are a method that keeps the write order of the data to the USER1 to USER3 in another area, a method that writes data representing the oldest data area to another area, a method that contains data as the serial number in the process code and a method that grasps the order by the process management apparatus or the management apparatus.

Next, a method for verifying the process pass certificate data generated and written to the RFID tag in FIGS. 14 to 17 will be explained.

FIG. 18 shows the content of the memory after the RFID tag has passed through the five processes shown in FIG. 14. The USER1 of the RFID tag 300 stores the process data DDDD 846 of the process D. The USER2 stores the process data EEEE of the process E. The USER3 stores 0000, that is, no data exists. The USER4 stores the process pass certificate data 849 generated after the RFID tag has serially passed through the process A, the process B, the process C, the process D and the process E. Whether or not the RFID tag 300 has passed through the correct processes can be verified by verifying this process certificate data 849.

Figure 19:
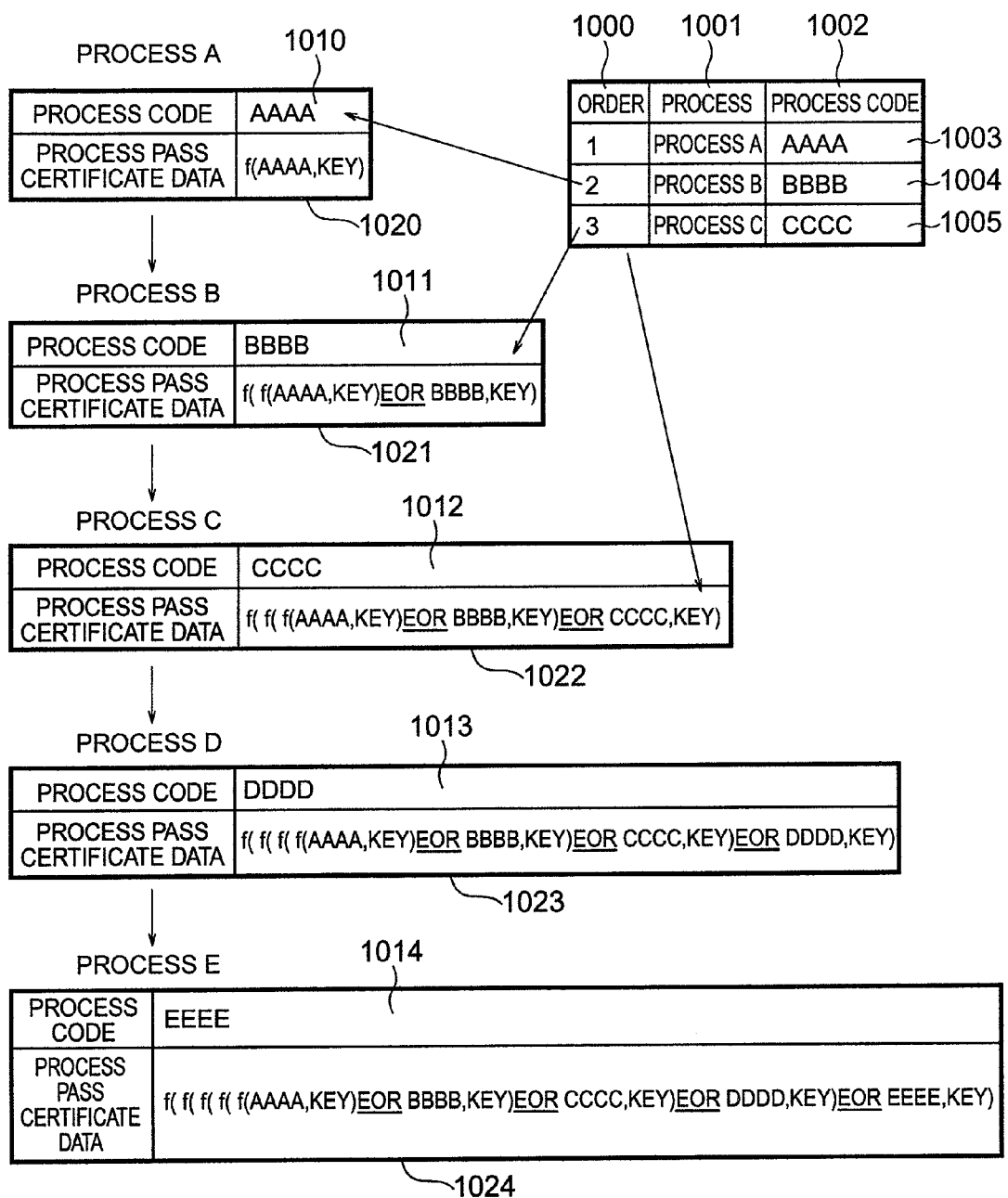
FIG. 19 shows a flow for generating a process pass certificate data for verification so as to verify the process pass certificate data in a process verification unit.

FIG. 19 shows the flow for generating the process pass certificate data written to the RFID tag in the last process when the RFID tag has passed through the correct processes, to verify the process pass certificate data in the process verification unit.

First, the process pass certificate data in the process A is generated. Since only the process codes of the processes D and E are stored in the memory of the RFID tag 300, however, it is not possible to know the process code of the process A. Therefore, the process code built up in the management apparatus connected through the network is acquired and used. The upper right part of FIG. 19 represents the data transmitted from the process management apparatus and built up in the management apparatus. The process 1001 of the serial number 1000 stored in the RFID tag 300 as well as the process code 1002 of the process 1001 are stored. Therefore, it is possible to acquire the order of the passage through the processes, the process code AAAA1003 of the process A, the process code BBBB1004 of the process B and the process code CCCC1005 of the preceding C.

The process pass certificate data f (AAAA, KEY) 1020 is determined in the process A by using the process code AAAA1010 of the process A, the function f ( ) and the KEY. The function f ( ) and the KEY are held by the process verification unit or the process management apparatus or the management apparatus and is acquired in the process verification unit.

In the process B, the process pass certificate data f (f (AAAA, KEY) EOR BBBB, KEY) 1021 of the process B is determined by using the process code BBBB1011 of the process B, the function f ( ) and the KEY and the process pass certificate data of the process A that should have been generated and written if the RFID tag has passed through the correct processes.

In the process C, the process pass certificate data f (f (f (AAAA, KEY) EOR BBBB, KEY) EOR CCCC, KEY) of the process C is determined by using the process code CCCC1012 of the process C, the function f ( ) and the KEY and the process pass certificate data of the process B. The process code of the process D and the process code of the process E are stored in the USER1 and USER2 of the memory of the RFID tag 300 and the process code of each process is read from the RFID tag.

In the process D, the process pass certificate data f (f (f (f (AAAA, KEY) EOR BBBB, KEY) EOR CCCC, KEY) EOR DDDD, KEY) of the process D is determined by using the process code DDDD1013 of the process D, the function f ( ) and the KEY and the process pass certificate data 1022 of the process C.

In the process E, the process pass certificate data f (f (f (f (f (AAAA, KEY) EOR BBBB, KEY) EOR CCCC, KEY) EOR DDDD, KEY) EOR EEEE) of the process E is determined by using the process code EEEE1014 of the process E, the function f ( ) and the KEY and the process pass certificate data 1023 of the process D. Whether or not the RFID tag 300 has passed through the correct processes can be verified by verifying whether or not the process pass certificate data of the process E hereby determined is coincident with the process pass certificate data stored in the USER4 of the RFID tag 300 shown in FIG. 18.

Figure 20:
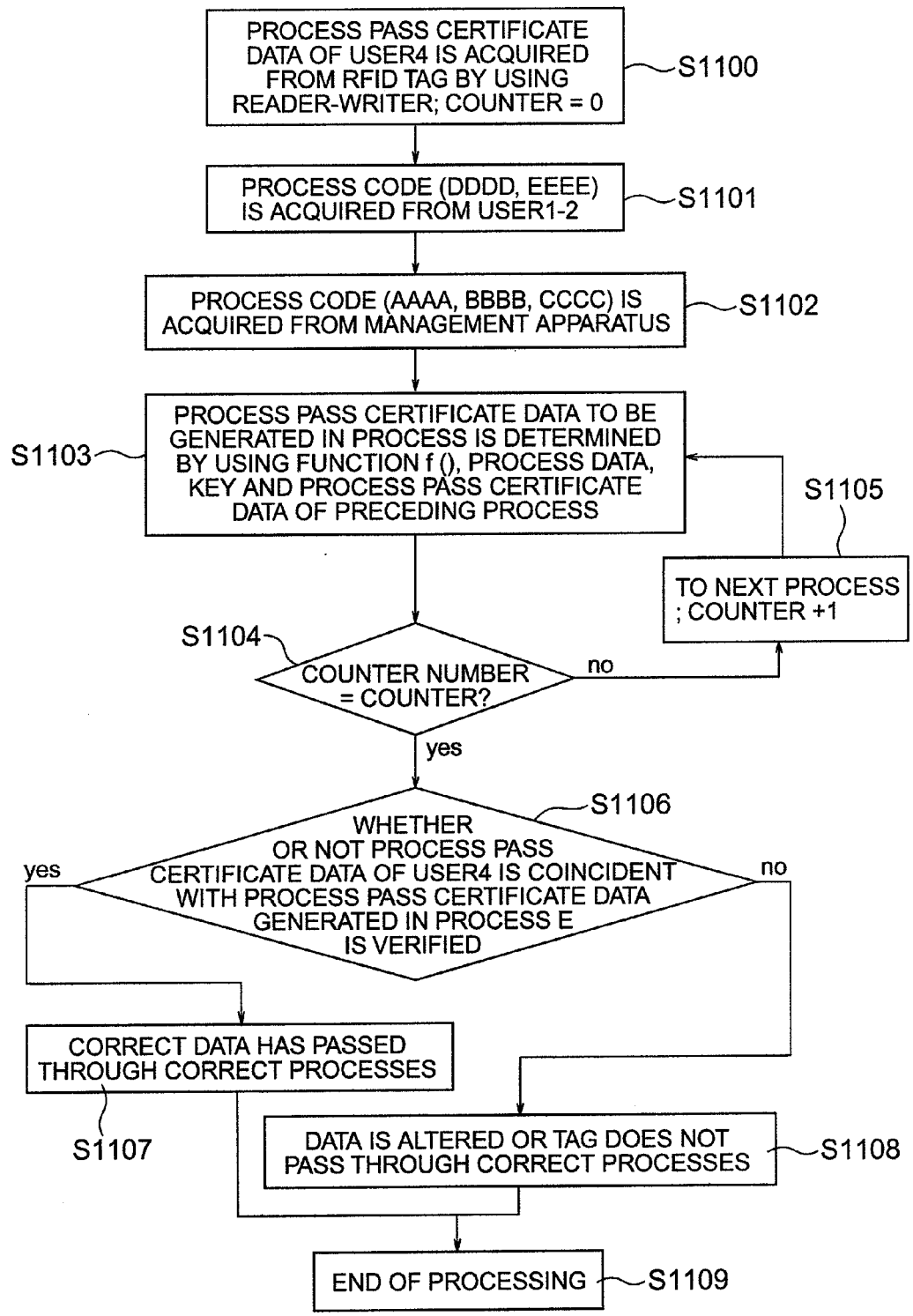
FIG. 20 shows a flowchart representing a process for verifying the process pass certificate data of the information recording medium RFID tag in the process verification unit.

FIG. 20 shows the flow of the processing in the process verification unit to verify the process pass certificate data of the RFID tag explained with reference to FIG. 20. Detailed explanation will be omitted about those portions of the processing which is the same as that of FIG. 13.

When the processing is started, the process pass certificate data stored in the USER4 of the RFID tag 300 is read in step S1100 by using the reader-writer of the process management apparatus and 0 is set to the counter. The flow then proceeds to step S1101.

The process data stored in the USER of the RFID tag 300 is acquired in step S1101 and the flow proceeds to step S1102. In this example, the process code DDDD of the process D and the process code EEEE of the process E are acquired. The USER3 keeps 0000 or in other words, the process code is not stored.

In step S1102, the process code transmitted by the network-connected process management apparatus to the management apparatus and stored in the latter is acquired from the management apparatus and the flow proceeds to step S1103. In this embodiment, the process code AAAA of the process A, the process code BBBB of the process B and the process code CCCC of the process C are acquired.

In step S1103, the process pass certificate data to be generated in the present process is generated by using the function f ( ), the process data, the KEY and the process pass certificate data generated in the preceding process. When no preceding process exists, the process pass certificate data of the preceding process is regarded as being nil or 0000 or an initial value set in advance is used.

In step S1104, the process number and the counter are compared. When they are coincident, the flow proceeds to step S1106 and when not, the flow proceeds to step S1105. In step S1105, 1 is added to the counter and the processing for determining the process pass certificate data in the next process is executed.

In step S1106, whether or not the process pass certificate data stored in the USER4 of the RFID tag 300 is coincident with the process pass certificate data generated for verification is verified. When they are coincident, the flow proceeds to step S1107 and when not, the flow proceeds to step S1108.

In step S1107, the process pass certificate data of the RFID tag 300 is judged as being correct and as having passed through the correct processes, and the flow proceeds to step S1109. In step S1108, on the other hand, the process pass certificate data is judged as being altered or as not having passed through the correct processes and the flow proceeds to S1109. In step S1109, verification of the process pass certificate data is finished and the processing is completed. The verification result may be transmitted to the external apparatus or displayed on a display.

FIGS. 14 to 20 show the example in the construction in which the process management apparatuses of the processes A and D among the five processes A, B, C, D and E are connected to the management apparatus through the network but the number of processes, the number of process management apparatuses connected to the management apparatus and their combinations are not restrictive. Because the process code is written to the RFID tag, however, preferred is a construction in which the number of process management apparatuses connected through the network is within the range of the number of memories of the RFID tag.

One of the USER areas of the RFID tag which are freely readable and writable is used to store the process pass certificate data and the rest, for storing the process codes. When the number of USER of the RFID tag is N, it is preferred to employ a construction in which the number of process management apparatuses connected through the network is not greater than N−1. According to such a construction, the process verification unit and the management apparatus are not connected through the network and even when the process code is not known, the process order can be verified by the number corresponding to the number of process codes stored in the USER of the RFID tag.

As for the transmission timing of the data of the USER of the RFID tag by the network-connected process management apparatus to the management apparatus, transmission may be made at the timing at which no free space exists in the USER any more or the timing at which no free space exists for write. Furthermore, the process management apparatus that transmits without fail the content of the USER is decided in advance and transmission is made when the RFID tag passes through this process management apparatus.

As for the USER data that are to be transmitted and erased, the data of the USER may be transmitted and erased as represented in the foregoing embodiment or only the oldest data may be transmitted and erased. Further, two or more data may be transmitted and erased.

As for the verification timing of the process order by the process verification unit, verification may be carried out at any timing as long as the necessary process code can be acquired. For example, after the RFID tag has passed through all the processes, the process code stored in the USER of the RFID tag and the process code built up in the management apparatus are acquired finally and verification is executed. Verification may further be made by an arbitrary process management apparatus in an intermediate process or before transmission of the data to the management apparatus when no free space exists in the RFID tag any more. When the process data stored in the USER of the RFID tag exists, the process order can be verified by the number corresponding to the process data stored even when the management apparatus network-connected does not exist.

In the foregoing embodiment, the process pass certificate data is generated by using the process code, the KEY and the function f ( ) but there remains the problem that the process pass certificate data of the products passing through the two same processes becomes the same. Therefore, a method for using data of UII as identification data of the RFID tag having different data for each product will be explained. Symbol UII represents the memory structure of the RFID tag shown in FIG. 7 by UII322 and has different ID and different information for each product to which the tag is to be bonded.

Figure 21:
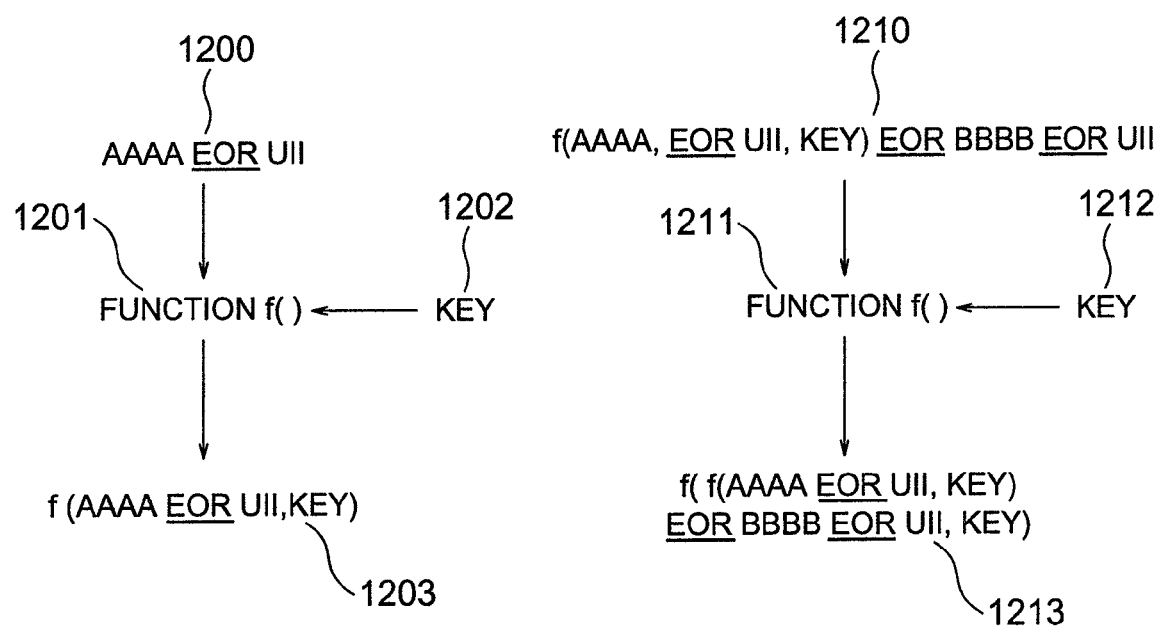
FIG. 21 shows a flow for adding and processing data of UII as identification data of the information recording medium RFID tag at the time of generation of the process pass certificate data in a process management apparatus.

FIG. 21 shows a processing for adding the UII data to the processing explained with reference to FIG. 8 when the process pass certificate data is generated. The first process not having a preceding process is shown at a left-hand part of FIG. 21. The detail will be omitted for those processing which are the same as in FIG. 8.

First, exclusive- or is carried out between the process data AAAA and the UII of the RFID tag 300 to get AAAA EOR UII1200. When no preceding process exists and 0000 or an initial value is used, exclusive- or is carried out between AAAA and UII and the initial value (or 0000). The process pass certificate data f (AAAA EOR UII, KEY) is determined by using this value, the function f ( ) 1201 and the KEY1202.

Next, the right-hand part of FIG. 21 shows the case where a preceding process exists. Exclusive- or is carried out between f (AAAA EOR UII, KEY) as the process pass certificate data of the preceding process, UII of the RFID tag 300 and the process code of its own process (here, BBBB) to get f(AAAA EOR UII, KEY) EOR BBBB EOR UII. The process pass certificate data f (f (AAAA EOR UII, KEY) EOR BBBB EOR UII, KEY) is determined by using this value, the function f ( ) 1201 and the KEY. The process pass certificate data thus generated is overwritten to the USER4 of the RFID tag.

The method for verifying the process pass certificate data has been explained with reference to FIGS. 13 and 20. This method generates the process pass certificate data by using the process data, the function f ( ) and the KEY but it is also possible to employ the method that generates in advance the process pass certificate data of the route patterns of all the processes, to keep this data as a table and to compare the data at the time of verification.

FIG. 22 is a table showing the route patterns of all the processes. The drawing shows the table of the patterns of all the three processes A, B and C, that is, A→B→C1220, A→C→B1221, B→A→C1222, B→C→A1223, C→A→B1224 and C→B→A1225 and the process pass certificate data of one process 1230, two processes 1231 and three processes 1232. When the process management apparatus or the process verification unit keeps this table, verification can be made without generating every time the process pass certificate data by acquiring the function f ( ), the KEY and the process code.

In the verification method of the process order explained so far, lock of read/write inhibition may be set to the USER when write is made to the memory of the RFID tag. In such a case, read is conducted after the lock of read/write inhibition is released. To set and release the lock of read/write inhibition, a password becomes necessary and the lock can be set or released only when the password is coincident with the password of the RFID tag. Therefore, the password is preferably kept by an authorized process management apparatus or an authorized process verification unit. Security against alteration can be further improved in this way. Lock of read/write inhibition may also be set to the area of the USER4.

The embodiment has thus been explained about the RFID tag as an example of the information recording medium. However, the invention is not necessarily limited to the RFID tag but may be applied to those information recording media which make it possible to transmit, receive and rewrite in a non-contact system the information stored or recorded to the information recording media with a certain communication distance. Therefore, the information recording media may be information processing apparatuses such as so-called "IC cards", mobile telephone units, mobile terminals, and so forth, and their combinations.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A process management apparatus comprising:
   a data transmission/reception unit configured to execute data transmission/reception to and from an information recording medium including a data storing unit configured to store identification data of an object to be managed;
   a process data holding unit configured to hold process data representing a process; and
   a process pass certificate data generation unit configured to generate process pass certificate data representing the passage through a process from said process data representing said process;
   wherein said data transmission/reception unit is configured to execute data transmission/ reception of said identification data, said process data and said process pass certificate data to and from said information recording medium, wherein the process pass certificate data is generated in accordance with both the identification data and the process data with performing calculations based on either one of a hash function or an encryption key;

wherein the process pass certificate data is stored in the data storing unit of the information recording medium;

wherein the data transmission/reception unit is arranged to receive both the identification data and the process pass certificate data having been stored in the data storing unit provided within the information recording medium;

wherein the process pass certificate generation unit is arranged to generate the process pass certificate data by using a hash function, in accordance with the identification data, the process data, and the process pass certificate data; and wherein the data transmission/reception unit is further arranged to cause the information recording medium to store, in the data storing unit, both the process data and the process pass certificate data.

2. A process management system including:

an information recording medium having a data storage unit, and a plurality of process management apparatuses each having a data transmission/reception unit communicable with said information recording medium;

wherein said information recording medium includes in said data storage unit: an identification data storing unit configured to store identification data of an object to be managed, a plurality of process data storage units each configured to store process data and at least one process pass certificate data storage unit configured to store process pass certificate data;

wherein said first process management apparatus of the process management apparatus includes: a first process data holding unit, a first process data generation unit for generating a first process data, and a first data transmission/reception unit for transmitting/receiving data to/from said information recording medium;

wherein said second process management apparatus of the process management apparatus includes: a second process data holding unit, a second process data generation unit for generating a second process data, and a second data transmission/reception unit for transmitting/receiving data to/from said information recording medium;

wherein said first process management apparatus is configured to:

obtain the identification data at the first data transmission/reception unit from the information recording medium, generate the first process pass certificate data at the process pass certificate data generation unit in accordance with both the identification data and the process data with performing calculations based on either one of a hash function or an encryption key, and transmit at the first data transmission/reception unit the generated first process pass certificate data to said information recording medium; and wherein said second process management apparatus is configured to:

obtain the identification data at the second data transmission/reception unit from the information recording medium, generate the second process pass certificate data at the process pass certificate data generation unit in accordance with both the identification data and the process data with performing calculations based on either one of a hash function or an encryption key, and transmit at the second data transmission/reception unit the generated second process pass certificate data to said information recording medium;

wherein the data transmission/reception unit is arranged to receive both the identification data and the process pass certificate data having been stored in the data storing unit provided within the information recording medium;

wherein the process pass certificate generation unit is arranged to generate the process pass certificate data by using a hash function, in accordance with the identification data, the process data, and the process pass certificate data; and wherein the data transmission/reception unit is further arranged to cause the information recording medium to store, in the data storing unit, both the process data and the process pass certificate data.

3. The process management apparatus according to claim 1, wherein an amount of data length of the process pass certificate data to be generated is a predetermined constant value.

4. The process management apparatus according to claim 1, wherein the process pass certificate data is stored with overwriting process pass certificate data having been past stored in case that process pass certification data has been already stored in the data storing unit of the information recording medium.

5. The process management apparatus according to claim 1, wherein said process pass certificate data is generated by using key data which is the same with each other for each process.

6. The process management apparatus according to claim 1, wherein said process pass certificate data is generated by using key data which is different from each other for each process.

7. The process management apparatus according to claim 1, which transmits command data for setting or releasing inhibition of read of data from said information recording medium or inhibition of write of data to said information recording medium.

8. The process management apparatus according to claim 1, further comprising:

a process order data storage unit configured to represent an nth data of said process data;

wherein said process pass certificate data generation unit is configured to generate said nth data of said process pass certificate data from at least nth data of said process data and (n −1)th data of said process pass certificate data, and to transmit it to said information recording medium.

9. The process management apparatus according to claim 1, further comprising:

a process verification unit configured to compare said process pass certificate data stored in said information recording medium passing through a plurality of processes with process pass certification data for verification, generated in accordance with the processes through which said information recording medium has passed, and to judge that said information recording medium has passed through said route processes when the comparison result proves coincident.

10. The process management apparatus according to claim 2, wherein an amount of data length of the first process pass certificate data, or an amount of data length of the second process pass certificate data is a predetermined constant value.

11. The process management apparatus according to claim 2, wherein the first and second process pass certificate data are stored with overwriting process pass certificate data having been past stored in case that the first and second process pass certification data has been already stored in the data storing unit of the information recording medium.

12. The process management apparatus according to claim 2, wherein said process pass certificate data is generated by using key data which is the same with each other for each process.

13. The process management apparatus according to claim 2, wherein said process pass certificate data is generated by using key data which is different from each other for each process.

14. The process management apparatus according to claim 2, further configured to:
  transmit command data for setting or releasing inhibition of read of data from said information recording medium, or inhibition of write of data to said information recording medium.

15. The process management apparatus according to claim 2, further comprising an n-th process management apparatus in the plurality of process management apparatus, configured to:
  hold, at an n-th process data holding unit having been provided within the n-th process management apparatus, n-th process data;
  obtain the identification data at an n-th data transmission/reception unit from the information recording medium;
  generate the n-th process pass certificate data at the process pass certificate data generation unit in accordance with both the identification data and the process data with performing calculations based on either one of a hash function or an encryption key;
  transmit at the n-th data transmission/reception unit the generated the n-th process pass certificate data to said information recording medium.

16. The process management apparatus according to claim 2, further comprising:
  a process verification unit configured to compare said process pass certificate data stored in said information recording medium passing through a plurality of processes with process pass certification data for verification, generated in accordance with the processes through which said information recording medium has passed, and to judge that said information recording medium has passed through said route processes when the comparison result proves coincident.

* * * * *